United States Patent [19]
Chaudhuri et al.

[11] Patent Number: 5,544,355
[45] Date of Patent: Aug. 6, 1996

[54] METHOD AND APPARATUS FOR QUERY OPTIMIZATION IN A RELATIONAL DATABASE SYSTEM HAVING FOREIGN FUNCTIONS

[75] Inventors: Surajit Chaudhuri, Stanford, Calif.; Kyuseok Shim, Greenbelt, Md.

[73] Assignee: Hewlett-Packard Company, Palo Alto, Calif.

[21] Appl. No.: 77,227

[22] Filed: Jun. 14, 1993

[51] Int. Cl.$^6$ ................................................ G06F 17/30
[52] U.S. Cl. ............................ 395/600; 364/DIG. 1; 364/283.4
[58] Field of Search ........................................ 395/600

[56] References Cited

U.S. PATENT DOCUMENTS

| 4,829,427 | 5/1989 | Green ................................. | 395/600 |
| 5,091,852 | 2/1992 | Tsuchida et al. ................... | 395/600 |

OTHER PUBLICATIONS

Makinouchi, et al., "The Optimization Strategy for Query Evaluation in RDB/V1", IEEE, 1981, pp. 518–529.
Chimenti et al., "Towards an Open Architecture for LDL", Proceedings of the 15th International VLDB Conference, pp. 195–203, Amsterdam, The Netherlands, Aug. 1989.
Chakravarthy, et al., "Logic–based Approach to Semantic Query Optimization", ACM Transactions on Database Systems, vol. 15, No. 2, pp. 162–207, Jun. 1990.
Pirahesh, et al., "Extensible/Rule Based Query Rewrite Optimization in Starburst", Proceedings of the 1992 ACM-–SIGMOD Conference on the Management of Data, pp. 39–48, San Diego, California, Jun. 1992.
Connors, et al., "The Papyrus Integrated Data Server", Proceedings of the First International Conference on Parallel and Distributed Systems, Miami Beach, Florida, Dec. 1991.
Greafe, et al., "The Exodus Optimizer Generator", Proceedings of the 1987 ACM–SIGMOD Conference on the Management of Data, pp. 160–172, San Francisco, California, May 1987.

Hass, et al., "Extensible Query Processing in Starburst", Proceedings of the 1989 ACM–SIGMOD Conference on the Management of Data, pp. 377–388, Portland, Oregon, Jun. 1989.
Jhingran, et al., "A Performance Study of Query Optimization Algorithms on a Database System Supporting Procedures", Proceedings on the 14th VLDB Conference, pp. 88–99, Los Angeles, California, Aug. 1988.
King, et al., "Quist: A System for Semantic Query Optimization in Relational Databases", Proceedings of the 7th International VLDB Conference, pp. 510–517, Aug. 1981.
Kolovson, et al., "Interoperability of Spatial and Attribute Data Managers: A Case Study", The 3rd International Symposium on Large Spatial Databases, Miami Beach, Florida, Dec. 1992.
Lohman, "Grammar–like Functional Rules for Representing Query Optimization Alternatives", Proceedings of the 1988 ACM–SIGMOD Conference on the Management of Data, pp. 18–27, Chicago, Illinois, Jun. 1988.
Selinger, et al., "Access Path Selection in a Relational Database Management System", Proceedings of the ACM-–SIGMOD International Symposium on Management of Data, Boston, Massachusetts, Jun. 1979.
Stonebraker, "Proceedings of the 1990 ACM–SIGMOD Conference on the Management of Data", pp. 281–290, Atlantic City, New Jersey, May 1990.

*Primary Examiner*—Thomas G. Black
*Assistant Examiner*—John C. Loomis

[57] ABSTRACT

Database applications typically need to invoke foreign functions or to access data that is not stored in the database. The invention provides a comprehensive approach to cost-based optimization of relational queries in the presence of such foreign functions. The optimization takes into account semantic information about foreign functions using a declarative rule language (e.g., SQL) to express such semantics. Procedures for applying the rewrite rules and for generating the execution space of equivalent queries are described. Procedures to obtain an optimal plan from this enriched execution space are also described. Moreover, necessary extensions to the cost model that are needed in the presence of foreign functions are described.

13 Claims, 4 Drawing Sheets

METHOD AND APPARATUS FOR QUERY OPTIMIZATION IN A RELATIONAL DATABASE SYSTEM HAVING FOREIGN FUNCTIONS

BACKGROUND OF THE INVENTION

1. Field of the Invention

The present invention relates to a relational database system and, more particularly, to query optimization techniques for a relational database system having foreign functions.

2. Description of the Related Art

Relational database systems provide the ability to conveniently query the data stored in their database. However, in many applications, there is a need to integrate data and operations that are external to the database (referred to as foreign functions). For example, it would be convenient to invoke mathematical functions and UNIX library functions as part of a relational query. Moreover, for many problem domains, highly tuned applications exist. The ability to exploit such existing applications is important since redevelopment can be prohibitively expensive. Also, for many applications, only part of the data that is needed may be stored in the database. Additional data may reside externally. Access to external data is provided by a set of interface routines.

As an example, many specialized Geographic Information Systems (GIS) are available today that provide the ability to store and access geographic data. On the other hand, information on attributes (e.g., population of a city) is usually stored in a relational database. Therefore, for GIS applications, the ability to use a relational query language as well as the ability to invoke functions provided by the GIS package is important. In general, the ability to invoke foreign functions in a relational query is important to develop applications.

To illustrate the key challenges to optimization introduced by foreign functions, consider two examples taken from an earlier application described in Kolovson et al., *Interoperability of spatial and attribute data managers: A case study*, Proceedings of the 3rd International Symposium on Large Spatial Databases, Miami, Fla., 1992. This known application was built in the Papyrus project, see Connors et al., *The papyrus integrated data server*, Proceedings of the First International Conference on Parallel and Distributed Systems, Miami, Fla., 1991. The application allows one to access information about businesses and their locations in the Bay Area of northern California. The application is built on top of the ETAK MapEngine and a relational storage manager. ETAK Inc. of Menlo Park, Calif. is a company that designs vehicle navigation equipment and produces digital map databases.

The MapEngine is a geographic data manager that provides the ability to store and query maps. The MapEngine stores the locations of the business establishments in the Bay Area in a file Map. The relational database is used to store attribute information about businesses (e.g., type of business) in a table Business. Each tuple of this table also stores an additional attribute which acts as a key for the MapEngine. The latter uses this key to look up the location of the business. Similarly, each record in MapEngine points to the tuple in the table Business of the relational database where the attribute information about the corresponding business establishment is maintained. Thus, queries are permitted to span the relational system as well as the MapEngine.

EXAMPLE 1

The aim of this example is to highlight the importance of the semantic information associated with the foreign functions, for optimization. The MapEngine provides a function to access all points (a point or a window is represented as a single argument, although a variety of representations is possible) in a map (Map) and a boolean function (Inside) to test whether a given point is within a window. The function Inside is an arithmetic function. The MapEngine also provides an additional function Mapclip that, given a window, returns all points in the map that are in that window. Consider a query to find, given a window, all points in the map that are in the window. The query can be answered by invoking Map and testing that each of the retrieved locations is inside the window (by using the function Inside). However, the use of the fact that the query can be answered by invoking Mapclip is significant since the use of Mapclip can greatly reduce the cost of evaluation of the query.

EXAMPLE 2

The aim of this example is to highlight that the decision to modify a given query by semantic optimization may need to be cost-based. Consider the problem of finding all restaurants in downtown Palo Alto. This query can be answered by selecting all restaurants from the table Business and then performing a Mapclip. However, MapEngine also has a file Map_Restaurant consisting of all the establishments that are restaurants. Therefore, this semantic information can be used to answer the queries. One could invoke Map_Restaurant to obtain all restaurants in the Bay Area and then can select those in downtown Palo Alto by invoking Inside. These two queries are equivalent, but the optimal plan for one of the queries may be better, even by an order of magnitude, compared to the optimum plan for the other query, depending on whether the indexing effect of restricting locations to downtown Palo Alto is more effective than indexing based on restricting the businesses to be restaurants.

Example 1 illustrates that in the presence of foreign functions, there may be multiple ways to answer the same query and such semantic information is extremely valuable for query optimization and must be captured. Example 2 illustrates that application of such semantic information for query optimization may need to be cost-based.

The ability to answer relational queries efficiently relies on the repertory of evaluation options and an optimizer to choose among these options. Therefore, when relational queries have the ability to invoke foreign functions, the database system needs to provide sufficient evaluation options and necessary extensions to the optimizer so that queries involving foreign functions can be effectively optimized. Existing optimizers, however, are unable to satisfy this need. Of course, there are other dimensions to the problem of invoking foreign functions (e.g., format conversion, supporting complex objects), but the focus of the invention is on optimization and related issues only.

In recent years, several extensible systems have been proposed with varying degrees of extensibility. See, e.g., Carey et al., *Extensible database management systems*, ACM-SIGMOD Record, Dec. 1990; Greafe et al., *The exodus optimizer*, Proceedings of the 1987 ACM-SIGMOD Conference on the Management of Data, pp. 160–172, San Francisco, Calif., May 1987; Hass et al., *Extensible query processing in starburst*, Proceedings of the 1989 ACM-SIGMOD Conference on the Management of Data, pp.

377–388, Portland, Oreg., June 1989, Stonebraker et al., *On rules, procedures, caching and views in database systems*, Proceedings of the 1990 ACM-SIGMOD Conference on the Management of Data, pp. 281–290, Atlantic City, N.J., May 1990. Rewrite languages for optimization in extensible systems are also known. See, e.g., Pirahesh et al., *Extensible/ rule based query optimization in starburst*, Proceedings of the 1992 ACM-SIGMOD Conference on the Management of Data, pp. 39–48, San Diego, Calif, May 1992; Lohman, *Grammer-like functional rules for representing query optimization alternatives*, Proceedings of the 1988 ACM-SIGMOD Conference on the Management of Data, pp. 18–27, Chicago, Ill., June 1988; Greafe et al., supra. The references of Pirahesh et al., Lohman, and Greafe et al. are hereby incorporated by reference.

The known approaches to query optimization using rewrite rules have several drawbacks. First, the rewrite rules are used heuristically, i.e., the optimality of the plan produced by the optimizer is with respect to a cost model. Second, the rewrite languages used by known systems are procedural, not declarative, which makes it difficult to specify the rewrite rules as well as to optimize their execution.

Query optimization in the presence of foreign function was examined in Chimenti et al., *Towards an open architecture for LDL*, Proceedings of the 15th International VLDB Conference, pp. 195–203, Amsterdam, August 1989, which is hereby incorporated by reference. In this reference LDL programs were extended to allow foreign tables and to define cost descriptors for the foreign tables. The LDL system did not make use of rewrite rules containing semantic information about the foreign functions.

Thus, prior attempts to optimize queries invoking foreign functions have not made use of a high level language for rewrite rules to express semantic relationships of foreign functions. Nor have prior attempts been able to guarantee that an optimal plan can be obtained using rewrite rules and cost models for foreign functions. Therefore, the problem of cost-based optimization of relational queries in the presence of such foreign functions, has not previously been addressed satisfactorily.

SUMMARY OF THE INVENTION

An objective of the invention is to provide improved cost-based optimization of relational queries in the presence of foreign functions.

Broadly speaking, the invention concerns an optimization approach that takes into account semantic information about foreign functions.

More particularly, the invention is a comprehensive approach for query optimization in the presence of foreign functions. Rewrite rules are used to express semantics of foreign functions. The rewrite rules are specified using an extension to the query language. The rewrite rules present an optimizer with a space of equivalent queries. The invention also ensures that an optimal plan (from the plans for the original query as well as the alternative queries generated by rewrite rules) is obtained.

The inventions has many other aspects which are completely described in the detailed description. For example, the invention makes use of a rule-independent procedure for application of the rewrite rules to produce equivalent queries, and exploits the commonality among queries when optimizing the alternative queries.

The ability to invoke foreign functions in a relational query is important for many applications since it provides them the opportunity to exploit existing code and data that is external to the database. The present invention enables queries that invoke foreign functions to be efficiently and effectively optimized.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1–4. However, those skilled in the art will readily appreciate that the detailed description given herein with respect to these figures is for explanatory purposes as the invention extends beyond these limited embodiments.

The invention concerns a relational database management system which includes method and apparatus for optimizing queries that invoke foreign functions. Semantic information is specified in a declarative way (using a simple extension to SQL) by using rewrite rules that express semantics of foreign functions. The incorporation of semantic information implicitly enhances the space of choices available to the optimizer. An optimal plan is then picked in a cost-based fashion that considers all alternate phrasings of the query implied by the semantic information. Additionally, heuristics can be incorporated in the optimization approach.

Figure 1:
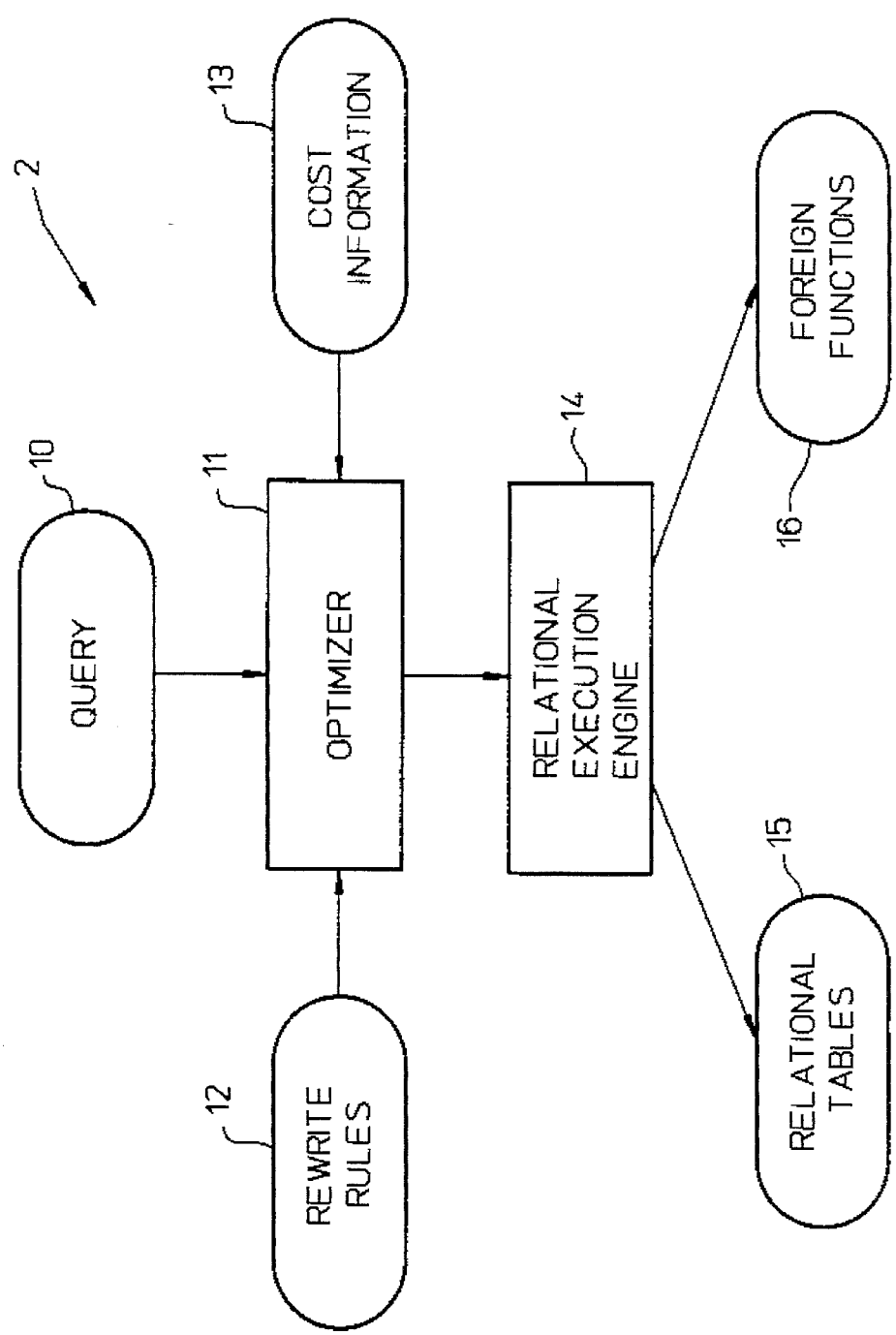
FIG. 1 is a block diagram of a relational database system in accordance with the invention.

FIG. 1 is a block diagram illustrating a relational database system 2 in accordance with the invention. The relational database system 2 receives a query 10 which is to be optimized. The query is supplied to an optimizer 11 which optimizes the query 10 in accordance with rewrite rules 12 and cost information 13. In particular, the optimizer 11 receives an input query to be processed, generates alternative queries using the rewrite rules 12, and then selects an "optimal" plan from a group of queries including the input query and the alternative queries. The relational database system 2 also includes a relational execution engine 14 which can access relational database tables 15 and foreign functions 16. The rewrite rules 12 are associated with either the foreign functions 16 or the database tables 15. The specifier of the rewrite rules 12 assures that over all databases the queries on either side of the rewrite rule are equivalent. The foreign functions 16 denote data and operations which are external to the database (e.g., foreign conditions, foreign tables or foreign functions). Materialized views can also be viewed as foreign functions from the point of view of optimization.

Figure 2:
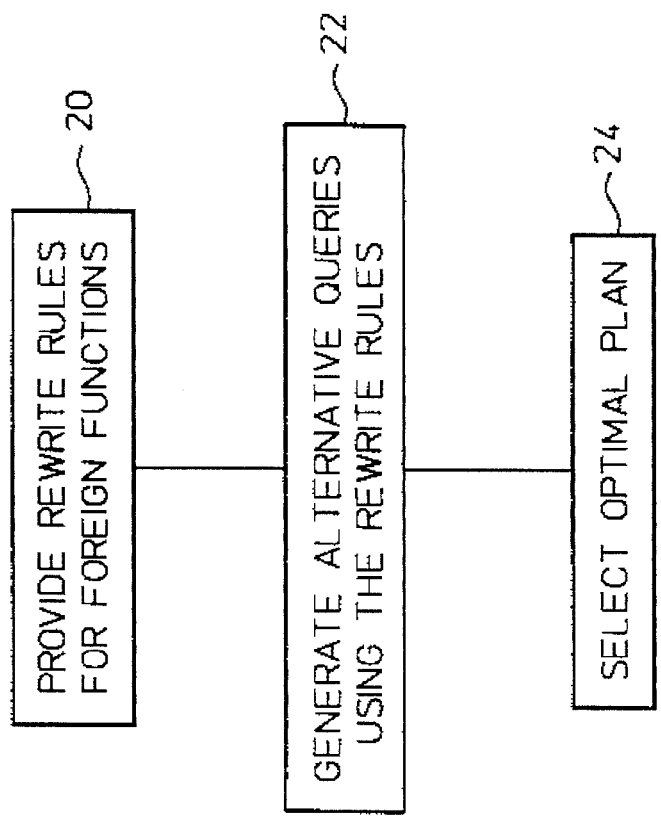
FIG. 2 is a basic flowchart illustrating the aspects of the invention.

FIG. 2 is a basic flowchart illustrating the aspects of the invention. As shown in FIG. 2, there are three aspects of the invention. The first aspect concerns the provision 20 of rewrite rules for foreign functions. The second aspect concerns generating 22 alternative queries using the rewrite rules. The third aspect concerns selection 24 of an optimal plan using a cost-based approach. Each of these aspects is described in detail below.

First Aspect of the Invention

A first aspect of the invention relates to the provision 20 of rewrite rules 12 for foreign functions 16 in a relational database system 2. A rewrite rule is used to rewrite a query including foreign functions (e.g., tables) as an equivalent query which has a different format but still includes foreign functions (e.g., tables). The equivalent query may be executed more efficiently. Hence, the rewrite rules for the foreign functions enhance the optimization potential of query optimizers by taking into account semantic information about foreign functions.

The focus of the invention is directed toward conjunctive queries. Conjunctive queries correspond to a subset of SQL which has the following form:

```
SELECT columnlist FROM Tablelist
WHERE cond1 AND ... AND condn
```

Observe that the WHERE clause is a conjunction of conditions cond1 . . . condn.

Every conjunctive query is a flattened select-project-join (SPJ) query. This subset of SQL is most widely used. Although the embodiments of the invention discussed below concentrate on conjunctive queries, the invention is generally applicable to all SQL queries.

For notational convenience, conjunctive queries may be represented as domain calculus expressions as is done in nonrecursive Datalog. See, e.g., Ullman, *Principals of Database and Knowledge-Bases Systems*, Computer Science Press, 1989. In a domain calculus expression, a conjunctive query is represented as a set of conjuncts (literals). Each conjunct is a table name with arguments. There are no explicit equality clauses in such a domain-calculus expression. Instead, the equalities are implicitly represented as equality of variables in the expression. Like SQL, the result of such a domain-calculus expression is a bag of tuples. This approach differs from the approach used in Deductive Databases, where a set semantics is associated with such a notation.

No special syntax in the domain calculus notation is needed to refer to foreign functions. A reference to foreign function in the domain calculus notation appears simply as another conjunct. Therefore, foreign functions are modeled as foreign tables (the terms foreign functions and foreign tables are used interchangeably). The following example indicates how in the domain calculus representation, any reference to foreign functions in the query is represented uniformly as a conjunct although the reference may occur as a condition, table or function in the SQL query.

EXAMPLE 3

Consider a slightly modified version of the query that was informally stated in Example 1. Assume that a table BUSINESS that has five attributes: NAME, TYPE, EARNING, SIZE and ETAKID. The map on MapEngine is modeled as a foreign table MAP consisting of attributes ETAKID and LOCATION. The attribute ETAKID in both the tables refers to the key in the MapEngine. Recall from Example 1 that Inside acts as a condition that checks whether a point is within a window. Therefore, it can be represented as a condition in the WHERE clause of the query. Finally, a foreign function EXPECTED-REVENUE takes the size of a restaurant as an input argument and estimates the average expected earning of a restaurant. The following query finds all restaurants that are in the map in the window w and who are making more profit than the expected amount.

```
SELECT BUSINESS.NAME, MAP.LOCATION
FROM BUSINESS, MAP
WHERE BUSINESS.TYPE = 'Restaurant'
AND BUSINESS.ETAKID = MAP.ETAKID
AND INSIDE(w, MAP.LOCATION)
AND BUSINESS.EARNING > EXPECTED-
   REVENUE(BUSINESS.SIZE)
```

The domain-calculus representation for the same query is:

Query(name) :- Business(name, "Restaurant", earn, size, eid), Map(eid, location), Inside$^{bb}$(w, location), Exp_Rev$^{bf(size, exp)}$, earn > exp Observe that depending on whether the foreign function occurs as a table (MAP) or as a function (EXPECTED-REVENUE), its representation in the domain-calculus notation varies. Namely, the foreign function occurring as a table has arguments for each of its attributes, whereas the foreign function corresponding to a function has one argument position for every input argument position and one argument position for every output argument position. The superscripts are used to indicate the safety constraints on the foreign functions. For an n-ary conjunct, the superscript is an n-ary list, one for each argument position. The superscript b (bound) indicates whether the argument must be passed a value, before the foreign function is invoked. Otherwise, the superscript is f (free). For example, the conjunct Inside requires both its arguments to be bound. For simplicity, the superscript is omitted below if all the arguments may be free, or where the binding information is not relevant.

In the domain-calculus representation, references to all tables, foreign or local (i.e., stored), appear similar in the query. Even so, the distinction between a foreign table and a database table is important for query evaluation as well as for query optimization.

The objective of the rewrite rules is to capture semantic information associated with foreign tables and their relationship to database tables. The representation of rewrite rules is declarative. The declarativeness of the rewrite rules not only makes it possible to provide a formal semantics and but also facilitates rule-independent algorithms for application of rules and generating 22 alternatives to the given query.

The representation of rewrite rules requires only simple extensions to the query language SQL. Roughly speaking, a rewrite rule has the format REWRITE QUERY1 AS QUERY2 where QUERY1 and QUERY2 are relational queries. It is required that the result of the queries have the same arity (i.e., number of columns). An important point is that application of such a rule, by default, generates a new query which is considered by the optimizer 11 as an alternative to the given query 10 (though one could specify that only the new query is to be considered). In any case, the final selection 24 of a query from the given query 10 and the alternatives produced 22 by the rewrite rules is made based on cost-based optimization.

The following notation is used for the rewrite rules.

$$E_l(x, y) \Rightarrow E_r(x, z)$$

The expressions $E_l(x, y)$ and $E_r(x, z)$ are conjunctive expressions and will be called the left-hand side (lhs) and the right-hand side (rhs) of the rule respectively. The variables x, y and z are ordered sets of variables. The set of variables x which occurs in either side of the rewrite rule are called universal variables. As will be discussed in more detail below, the rewrite rule says that the left-hand side of the rule can be replaced by the right-hand side of the rule "over universal variables." In addition, the notation ⇔ is used to indicate two rules all at once (i.e., bidirectional rules).

As a first example of a rewrite rule, consider the rule informally used in Example 1. This rewrite rule can be represented in a domain calculus notation as:

Map(eid, loc), Inside(window,lot) ⇒Mapclip(eid, loc, window) Note that the safety constraint for Mapclip is (ffb). In this rewrite rule, the variables eid, loc and window are all universal variables.

As a second example of a rewrite rule, the following rule was used informally in Example 2. Business(name, "Restaurant", earn, size, eid), Map(eid, loc) ⇔ Map_Restaurant(eid, loc) This rule says that in order to obtain locations of all restaurants, one can either take a join between Business and Map or one can use the ETAK file Map_Restaurant. Here, eid and loc are universal variables. Note that Map_Restaurant acts like a materialized view. Thus this example illustrates how schematic alternatives presented by materialized views can be expressed by rewrite rules.

As a third example of a rewrite rule, the following rule for MapEngine says that instead of separately checking whether a point belongs to two given windows, one can check whether the point belongs to the intersection of windows. Inside(w1,point), Inside(w2,point) ⇒Inside(w,point), Intersect(w1,w2,w) Using this rewrite rule, the problem of finding all businesses in multiple windows can be reduced to the problem of finding all businesses in the intersection of the windows.

As a fourth example of a rewrite rule, the following rewrite rule facilitates query optimization. It is often useful to be able to indicate to the optimizer that an index exists so that it can be used when appropriate. For example, assume there is an index on Map for a given eid. A rewrite rule based on this assumption would then be as follows:

Map(eid, loc) ⇔ Mapwithid$^{bf}$(eid,loc)

The safety constraint on Mapwithid is (bf) which requires the eid to be specified before it is invoked. Just as in traditional optimization, use of an index is cost-based, so must the choice between the given query and the query obtained by an application of the above rule.

Generally speaking, the rewrite rule is used to generate alternatives to the given query by applying the rules from left to right. The formal semantics associated with a rewrite rule has the following two components: equivalence and directionality. Two queries are equivalent if they result in the same bag of tuples over any database.

First, a rewrite rule assures the following equivalence. For a rewrite rule, $E_l(x, y) \Rightarrow E_r(x, z)$, over any database, the queries $Q_l$ and $Q_r$, as defined below, result in the same bag of tuples.

$Q_l(x):-E_1(x, y)$ $Q_r(x):-E_r(x, z)$

By virtue of the above equivalence, a rewrite rule can be used to derive an equivalent query by "substituting" subexpressions in a query. Observe that only the universal variables occur as projection variables of $Q_r$ and $Q_l$.

Next, a rewrite rule also specifies directionality, as indicated by the arrow (⇒). The arrow is used to indicate that only an occurrence of the left-hand side of the rule should be "substituted" by the corresponding occurrence of the right-hand side (and not vice-versa) to generate equivalent queries.

Consider the first example of a rewrite rule discussed above. The semantics imply that, over any database, queries $Q_l$ and $Q_r$ must result in same bag of tuples over any database.

$Q_l$(eid, loc, window) :- Map(eid, loc), Inside(window, loc)
$Q_r$(eid, loc, window) :- Mapclip(eid, loc, window)

This rewrite rule has an occurrence in the query Q, given below. The left-hand side of the rule matches the second and the third conjuncts of Q. By replacing those conjuncts with the corresponding substitution for the right-hand side of the rule, the query Q' is obtained.

Q(name,loc):-Business(name, "Restaurant", earn, eid), Map(eid, loc), Inside(w, loc), Intersect(w1, w2, w)

Q'(name,loc) :–Business(name, "Restaurant", earn, eid), Mapclip(eid, loc, w), Intersect(w1, w2, w)

The directionality of the semantics imply that the rule in the third example of the rewrite rules cannot be applied to query Q although an application will result in an equivalent query.

In the preferred embodiment of the first aspect of the invention, the rewrite rules are provided 20 to the relational database system 2 using a high level language such as an extension of the query language SQL. Thus, although the domain calculus notation is used above to simplify the discussion, the rewrite rules are actually presented in an extension of SQL. For example, the first example of the rewrite rule noted above might appear as:

REWRITE
  SELECT eid, loc
  FROM MAP
  WHERE INSIDE(windows, loc)
AS
  SELECT eid, loc
  FROM MAPCLIP
  WHERE MAPCLIP.WINDOW = WINDOW Second Aspect of the Invention The second aspect of the invention concerns the approach used to generate 22 alternative queries using the rewrite rules 16. In this section, it is assumed for simplicity sake that the queries have no inequality constraints.

It is important to note that a subexpression which is equivalent to the left hand side of the rewrite rule can be replaced by the right-hand side of the rewrite rule to derive a new query. Although the replacement step is easy, determining whether a subexpression is equivalent to the left hand side of a rewrite rule is more difficult. Thus, a novel procedure to check equivalence of two conjunctive queries is described below.

Using conventional knowledge, one might believe that two conjunctive queries are equivalent if and only if there is a renaming of variables such that there is a one-to-one mapping among literals in the query. In other words, two queries are equivalent if and only if they are isomorphic. However, merely substituting the right-side of a rewrite rule for a subexpression found to be equivalent to the left-side of the rewrite rule is not sufficient. The following example shows that such simple substitution is not enough to ensure equivalence.

EXAMPLE 4

The left-hand side of the following rewrite rule matches the query $Q_1$.

Business(name, "Restaurant", earn, size, eid),
  Map(eid, loc) ⇒Map_Restaurant(eid, loc)

Hence, the rewrite rule can be used to generate alternative query $Q_1'$ from query $Q_1$.

$Q_1$(loc):-Business(bizname, "Restaurant", earn, size, eid),
  Map(eid, loc), Owner(bizname,"bob")

$Q_1'$(loc):-Map_Restaurant(eid,loc), Owner(bizname, "bob")

Note $Q_1'$ is the effect of using the simple substitution approach to $Q_1$. Assume that bob owns only motels. The query $Q_1$ returns an empty set, but the query Q' need not.

The crux of the problem with simple substitution is that the semantics of rewrite rules ensure equivalence of both sides of the rule only over universal variables. Therefore, it is not enough for a mapping to satisfy the condition of one-to-one mapping. The mapping has to satisfy additional constraints. Thus, a novel procedure to check equivalency of two conjunctive queries must satisfy the one-to-one mapping as well as the additional restraints. This novel procedure is termed substitution mapping.

Substitution mapping is defined as follows. Let $1 \Rightarrow r$ be a rewrite rule and Q be a query. A mapping from variables of 1 to that of Q is called a substitution mapping from the rule to the query if:

(a) the mapping is one-to-one from literals in 1 to literals in Q;

(b) only universal variables in 1 are mapped to (if at all) constants in Q;

(c) images of the non-universal variables may not be among the projection variables of Q;

(d) the images of the non-universal variables of 1 may not appear in any literal of Q that is not in the image of 1; and (e) a constant in 1 can only map to itself.

In the definition, the term "image" of a variable (or a literal) with respect to a mapping means the variable (or the literal) to which the former is mapped. Likewise, the image of a query with respect to a mapping, refers to the literals obtained by applying the mapping to the query.

Comparing the above definition with the mapping performed in Example 4 shows that in this case the simple mapping performed violated condition (d) since bizname is an image of the non-universal variables. Consider a variant of the query in Example 4 where the literal Owner is replaced by Historic(loc) in Q. In such a case, the condition (d) is satisfied and the mapping satisfies substitution mapping.

In order to generate an alternative query, a rewrite rule is applied to a query using two basic steps. First, identify if there exists a subexpression such that there is a substitution mapping from the rule to the query. Second, substitute the subexpression with the right-hand side of the rule (after renaming).

A procedure to generate all equivalent conjunctive queries obtained by application of a rule to a query is as follows. All possible mappings which satisfy the condition of one-to-one mapping could be determined, and then the procedure could determine whether the mappings satisfy the additional constraints of substitution mapping. For queries with no repeated table names, applications of a rule can be performed in time $O(n \log n)$ in the size of the query and the rewrite rule (n). Since in practice most queries fall in this category, application of rules introduces little overhead for most queries.

The objective in introducing rewrite rules is to present the optimizer 11 with alternatives that arise due to semantics of foreign tables. The alternative queries are generated 22 by application(s) of the rules. Each of the generated queries is equivalent to the given query.

The closure of the query represents the set of all the alternatives that can be generated by applications of rewrite rules. More particularly, the closure of a query Q with respect to a set R of rewrite rules is the set of queries:

$$\text{closure}(R,Q) = \{Q' | Q \Rightarrow^*_R Q'\}$$

The symbol $Q \Rightarrow^*_R Q'$ is used to denote the fact that Q' has been obtained from Q by a finite sequence of applications of rewrite rules (drawn from the set R).

The rewrite rules can also be used in a sequence as illustrated by the following example.

EXAMPLE 5

Consider the following query.

Q(loc):-Map(eid, loc), Inside(w1, loc), Inside(w2, loc)

We can apply the rule in third example of the rewrite rules to generate the query Q':

Q'(loc):-Map(eid, loc), Inside(w, loc), Intersect(w1}, w2}, w)

Thereafter, an application of the first example of the rewrite rule results in the following query Q".

Q"(loc):-Mapclip(eid, loc,w), Intersect(w1}, w2}, w)

Traditionally, optimization is concerned with choosing an optimal plan for a query. However, in the presence of rewrite rules, the invention causes a set of equivalent queries (closure) to be produced. Thus, the optimization problem is to pick the cheapest among the optimal plans of the queries in the closure of the given query. The optimization approach of the invention is to first generate 22 a set of equivalent queries (Step 1), and then choose 24 the cheapest among the optimal plans for each query obtained (Step 2). Step 1 is detailed below, and Step 2 is described in the third aspect of the invention.

Given a query and a set of rewrite rules, a closure procedure computes the closure of the query with respect to the set of rewrite rules. The closure procedure is illustrated in FIG. 3.

Figure 3:
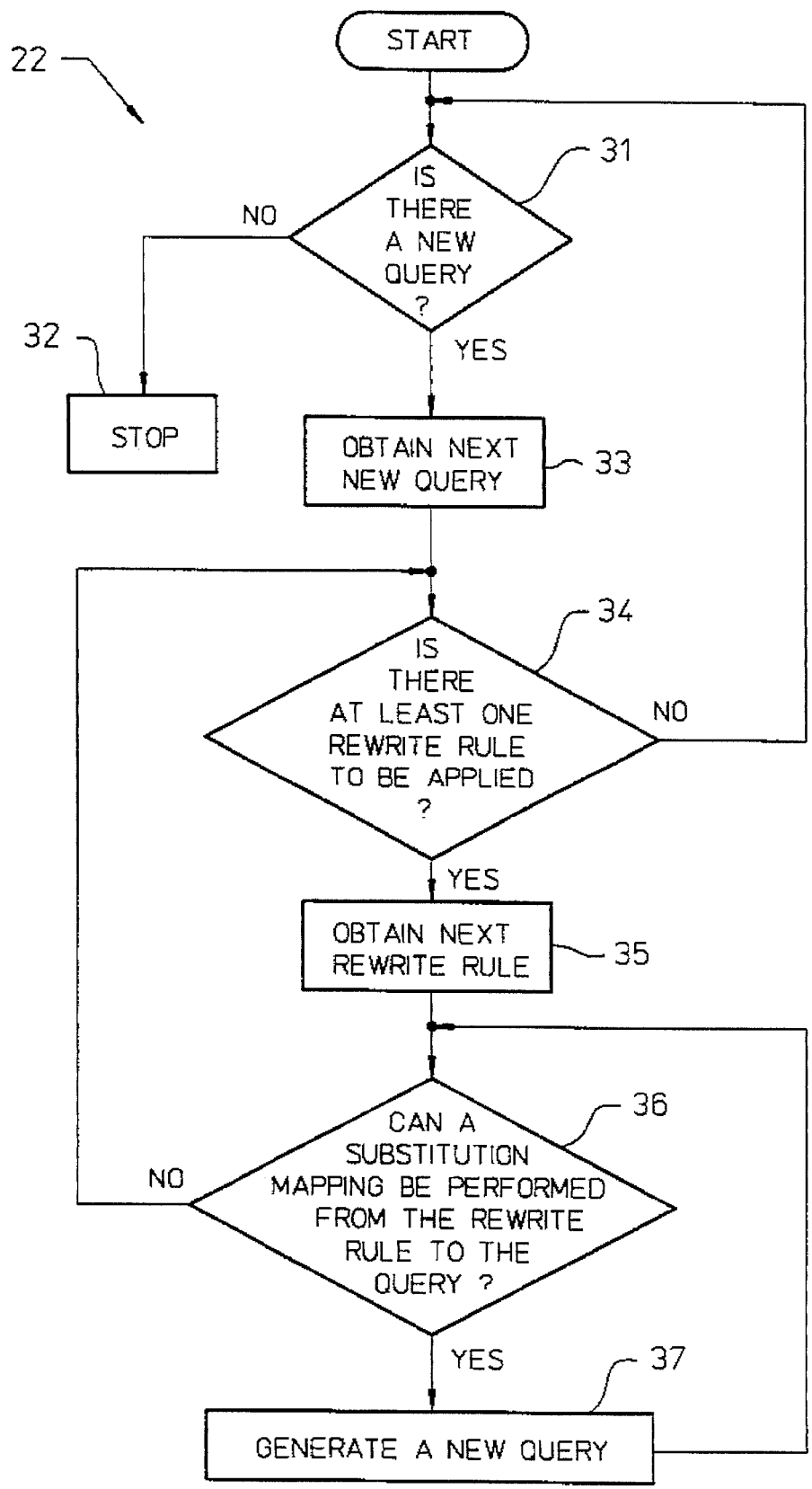
FIG. 3 is a flowchart illustrating a closure procedure according to the second aspect of the invention which generates equivalent queries.

FIG. 3 is a flowchart of an embodiment of the closure procedure according to the second aspect of the invention. Closure is the set of equivalent queries produced from the input query and the rewrite rules. The procedure begins by deciding 31 whether a new query is available for processing. On the first iteration, the new query is the input query 10 and it is available. On subsequent iterations, the new queries are the alternative queries which have been generated by other portions of the procedure.

In any case, if there are no queries available, the procedure is completed. On the other hand, if it is determined 31 that one or more new queries are available, then a next new query is obtained 33. Next, a decision 34 is made based on whether at least one rewrite rule is available to be applied. This decision 34, at minimum, would determine if, for example, a invoking a foreign function had at least one rewrite rule associated therewith. If no rewrite rules are available for use with the query, then the procedure returns to decision 31 to process the next query.

On the other hand, if it is determined 34 that at least one rewrite rule exists, then a next rewrite rule is obtained 35. The next rewrite rule is one of the rewrite rules which are available for use with the query. The next rewrite rule is then used in a decision 36 which determines whether a substitution mapping can be performed from the rewrite rule to the query. The requirements of substitution mapping were discussed in detail above. If the substitution mapping fails, the processing returns to decision 34 to determine if another rewrite rule is available. If the substitution mapping is successful, a new query is generated from the rewrite rule (in use) and the query (in use). Thereafter, the processing loops back to decision 36 for cases where the rewrite rule has more than one substitution mapping for the query in use (not the newly generated queue).

An example of programming code for a particular closure algorithm (gen_closure) is contained in Appendix A. The algorithm repeatedly invokes the function rewrite which is also contained in Appendix A. Given a rewrite rule r and a query Q, the function rewrite(r,Q) derives all queries that can be obtained by a single application of r to Q. In Appendix A, the phrase "sound application" refers to successful substitution mapping. The algorithm gen_closure is iterative and during each iteration, there is a set of queries (new) which acts as the seeds to generate additional queries by invoking rewrite. Only those derived queries that were never generated before, act as seeds to the next iteration. The algorithm gen_closure is a sound and complete procedure to obtain closure.

In order to access the relevant rules efficiently, it is preferable to maintain the rules in a rule-table (see FIG. 4) which is indexed on the conjuncts that appear on the left-hand side of the rule. It may also be advantageous to use rule classes which allow the rules to be partitioned into classes and then applied such that all rules in a given class would be applied before any rules in another class.

Generally speaking, in the closure procedure shown in FIG. 3 termination depends on whether the closure of the query with respect to a set of rewrite rules is finite or not. Thus, the procedure terminates if and only if the closure is finite. However, there could exist queries and rewrite rules such that the closure of a query with respect to a set of rewrite rules is an infinite set. As a result, several conditions are identified to facilitate closure.

Two conditions are described to ensure closure if a set of rewrite rules satisfies either of the conditions. The first condition is a Non-Increasing Length Property condition. This condition requires that the length of the right-hand side of every rule be shorter or equal to its left-hand side. For example, a domain-calculus expression length may be defined as the number of conjuncts in the expression. Thus, a rewrite rule satisfies the non-increasing length condition if the right-hand side of the rewrite rule is no longer than its left-hand side. As an example, the following rewrite rule fails to satisfy the non-increasing length property condition.

Map_Restaurant(eid, loc) ⇒ Business(name, "Restaurant", earn, eid), Map(eid, loc)

The second condition is a Non-Null Property condition. The non-increasing length property fails to capture (i.e., over inclusive) situations where although there is a local violation of non-increasing length property condition, the length of the rewritten query can not increase beyond a certain limit. The non-null property condition captures these situations. This test for termination of a set of rewrite rules R has two steps. First, a set of inequalities Ineq(R) is derived from a set R of rewrite rules. The set Ineq(R) of inequalities is constructed as follows:

Associate an integer variable with every table name.

Obtain an algebraic expression for every domain calculus expression by: replacing every literal by the variable corresponding to the table name, and replacing conjunction by addition.

For every rewrite rule of the form lhs ⇒rhs, an arithmetic inequality left_Exp≧Right_Exp is formed, where left_Exp and right_Exp are the algebraic expressions for lhs and rhs, respectively. In addition, every variable is greater or equal to zero. The set of arithmetic inequalities corresponding to a set R of rewrite rules will be denoted by Ineq(R). A set of rewrite rules R has finite closure for every query if no variable in Ineq(R) is null. A variable in Ineq(R) is said to be null if it must be assigned zero for every solution to Ineq(R). Efficient algorithms based on linear programming techniques are known and available to check whether a variable in a set of linear inequalities is zero in all solutions.

The non-null property condition is demonstrated by the following example. Consider the set of cyclic rewrite rules involving Map_Restaurant in the second example of the rewrite rules which fails to satisfy the non-increasing length property. The corresponding inequalities are (m for Map, r for Restaurant, d for Map_Restaurant):

$$\{m \geq 0, d \geq 0, r \geq 0, d \geq m+r, m+r \geq d\}$$

Evidently, there exists no variable which is null and therefore there is finite closure.

In addition to above conditions, heuristics can also be used to ensure termination of the closure procedure when neither of the termination conditions (e.g., non-increasing length property and non-null property) are satisfied. In such a case, the closure procedure enumerates only a finite subset of closure. Techniques to specify such a subset are discussed below. Furthermore, if desired, heuristics can also be used to eliminate some queries generated in Step 1 from consideration in Step 2 of the optimization process.

The closure of a query is typically limited to few queries. Nonetheless, heuristic techniques are useful in restricting the number of candidate equivalent queries that will be considered for optimization in the second phase of the optimization. These heuristic techniques can be of two types. First, only a subset of the closure can be enumerated. Next, some of the alternative queries generated may be eliminated from consideration in Step 2 of the optimization process.

For selective enumeration of closure, one can use a budget to determine the maximum time spent on enumeration. The closure procedure can be easily extended to incorporate this modification. Another alternative is to modify the rewrite rules. This alternative approach is illustrated by the following example.

EXAMPLE 6:

A rewrite rule such as:

---

Business(name, "Restaurant", earn, size, eid), Mapclip(eid, loc, window) ⇒ Business(name, "Restaurant", earn, size, eid), Mapclip(eid, loc, small_win), Intersect(window, w, small_win)

can be modified to be as follows:

Business(name, "Restaurant", earn, size, eid), Mapclip(eid, loc, window) ⇒ Business(name, "Restaurant", earn, size, eid), SpecialMapclip(eid, loc, window)

The modified rewrite rule contains a new table name SpecialMapclip. Unlike the original (unmodified) rule, the modified rewrite rule can not be used repeatedly since there is no rewrite rule where SpecialMapclip occurs in the left-hand side. However, after closure is generated, the expression "Mapclip(eid, loc, small_win), Intersect(window, w, small_win)" will be substituted for "SpecialMapclip(eid, loc, window)".

Hence, the example shows that a subexpression can be treated as a single literal, thereby reducing the size of the effective closure. The choice of subexpression is used to decide the subset of closure that is selected for enumeration. By using this strategy, one can ensure that any set of rewrite rules satisfy the non-length increasing property condition and thereby ensure termination. Another application of the heuristics is in identifying equivalent queries that need not be optimized. This may be determined by a crude cost estimate or by using the following approach. Some of the rewrite rules (e.g., the third example of the rewrite rules) may be marked as "always improving". If such a rule derives a query Q' from a query Q, then the query Q need no longer be optimized since it is assumed that Q' will always result in a better optimal plan.

Third Aspect of the Invention

Query optimization in the presence of rewrite rules and foreign tables require new dimensions to the traditional optimization problem. First, the presence of foreign tables require introduction of new join methods as well as cost models that are appropriate for foreign tables. In this section, it is assumed that the cost model assigns a real number to any given plan in the execution space, and satisfies the principle of optimality (see Cormen et at., *Introduction to Algorithms*, The MIT Press, 1990), which is implicit in all relational optimizers that use dynamic programming. Further, since the foreign tables may have safety constraints, the traditional join enumeration phase must ensure that only those reordering of the joins which satisfy the safety constraints are considered. In other words, one needs to ensure that the bindings that are passed to the foreign function satisfy the safety constraints. This is a well-studied problem. See, e.g., Ullman, *Principals of Database and Knowledge-Base Systems*, Computer Science Press, 1989 for a discussion. Finally, the task is to choose 24 an optimal plan from an enriched space, which contains multiple equivalent queries.

Of course, any discussion of optimality must be with respect to a space of possibilities. The execution of a query is traditionally represented syntactically as annotated join trees (see Krishnamurthy et al., *Optimization of nonrecursive queries*, Proceedings of International Conference on Very Large Data Bases, pp. 128–137, Kyoto, Japan, August 1986) where the internal node is a join operation and each leaf node is a base table. In accordance with the invention, a leaf node can also be a foreign table. The optimizer considers all left-deep annotated trees, thus forcing a linear ordering of joins. Therefore, the execution space is defined to be the space of all left-deep join trees for each equivalent query obtained from Step 1 of the optimization process. Step 2 of the optimization process is then to choose a plan of least cost from the execution space.

Figure 4:
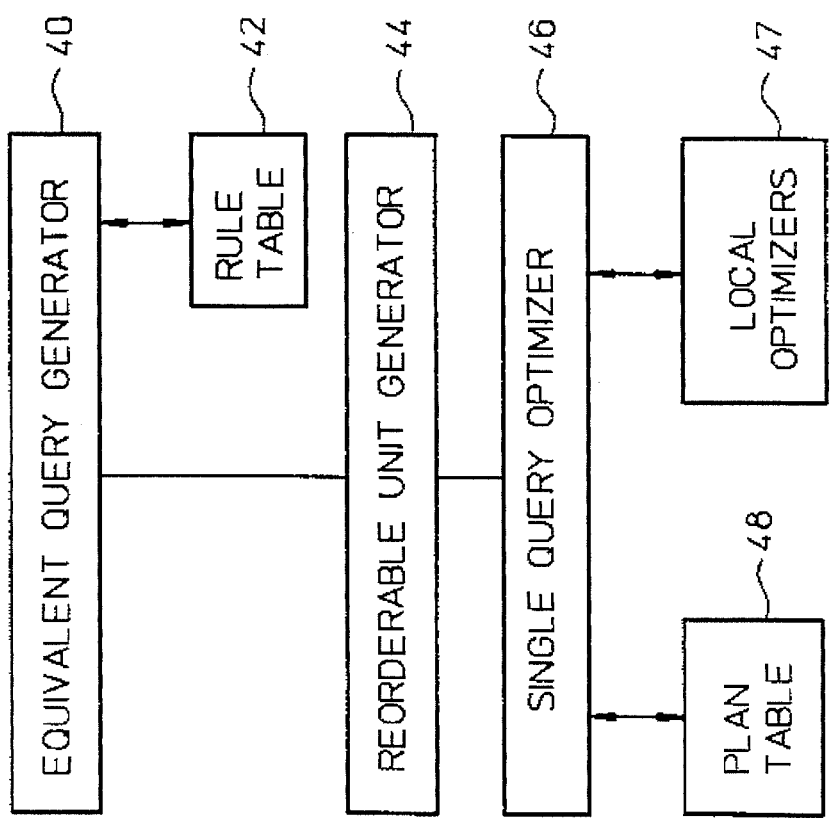
FIG. 4 is a block diagram of an embodiment of the optimization procedure according to the invention.

FIG. 4 is a block diagram of an embodiment of the optimization process according to the invention. FIG. 4 illustrates the functional units associated with the optimizer 11 shown in FIG. 1. In particular, the optimization process makes use of an equivalent query generator 40 which uses the rewrite rules 12 stored in a rule table 42 to produce the equivalent queries. The optimization process also makes use of a reorderable unit generator 44 and a query optimizer 46. The query optimizer 46 is able to operate efficiently by interacting with local optimizers 47 and a plan table 48. The optimization process according to the invention is discussed in more detail below.

Step 2 of the optimization process is performed by the query optimizer 46 which makes use of a cost optimization algorithm to determine or select the optimal plan from the execution space. Two different approaches for the cost optimization algorithm are described below.

The first approach for the cost optimization algorithm is a direct extension of the traditional dynamic programming optimization algorithm. Since the execution space is the union of the execution spaces of the equivalent queries, the optimal plan for each query in the closure can be obtained and then selection of the plan that has the least cost among them. For example, if $Q_1$ and $Q_2$ are the only two queries in the closure, one can determine the optimal plans $P_1$ and $P_2$ for $Q_1$ and $Q_2$ respectively, and then select the cheaper plan of $P_1$ and $P_2$. Therefore, the following cost optimization algorithm is a direct extension of the traditional dynamic programming algorithm and includes the steps:

(i) optimize each query using the traditional dynamic programming algorithm and obtain the best plan for the query.

(ii) choose the cheapest among the best plans obtained in Step (i). Observe that step (i) can be accomplished by any traditional relational optimizer (see, e.g., Selinger et al., *Access path selection in a relational database management system*, Proceedings of the ACM SIGMOD International Symposium on Management of Data, pp. 23–34, Boston, June 1979) with the straight forward extension to check for safety while considering a join order. The space requirement for this algorithm is the maximum space required for optimization of any of the equivalent queries. However, the algorithm has a poor time complexity since it fails to take advantage of the fact that there is commonality among queries in the closure.

The second approach for the cost optimization algorithm is preferred because it operates much faster than does the direct extension. The key to this approach is that the cost optimization algorithm exploits commonality among queries across multiple equivalent queries during optimization. Although the traditional dynamic programming based algorithm exploits the commonality among the subqueries of a single query to reduce the time complexity of the optimization, it does not exploit the commonality among subqueries across multiple equivalent queries during optimization.

Before describing the improved cost optimization algorithm, a description of how the subqueries that are shared by two or more equivalent queries can be identified. This identification process is performed during Step 1 of the optimization procedure where equivalent queries in the closure are generated 22 by applications of rules. The example which follows illustrates the identification process.

EXAMPLE 7

Consider an application of the second example of the rewrite rule to query Q that results in the query Q'. The MapEngine file Historic contains the location of all historic sites and the foreign table price$^{bf}$(loc, amount) provides the value of the real estate. The following query asks for prices of real estate of the places which are historic and have restaurants.

Q(amount):-Historic(loc), Business(bizname, "Restaurant", earn, eid), Map(eid, loc), Price(loc, amount)

Q'(amount):-Historic(loc), Map_Restaurant(eid,loc), Price(loc, amount)

Observe that the subexpression "Historic(loc), Price(loc, amount)" is common in both the queries. This commonality can be detected at the time the rewrite rule is applied by observing that the first and the last literals are left unchanged by the application of the rewrite rule. Since as part of optimizing the query Q, the optimal plan for the common subquery Historic(loc), Price(loc, amount) must be determined, it can be reused when determining the optimal plan for the query Q'.

In accordance with the improved cost optimization algorithm, each query is optimized one at a time, but for any subquery that is shared with another equivalent query (only those subqueries), its optimal plan is stored in a plan table 48 so that its optimal plan does not have to be rederived. Thus, when constructing the optimal plans, the plan table 48 is consulted to check whether the plan already exists.

An example of the programming code for the improved cost optimization algorithm is provided in Appendix A (i.e., procedure Optplan). Unlike the traditional algorithm, the improved algorithm follows a top-down approach. The base cases in Optplan where the query has only one or only two conjuncts have been omitted. The improved algorithm invokes local optimizers to generate $Q_i$ from $S_i$ and $q_i$ (see Appendix A). The local optimizers 47 make use of information about the cost-model. According to the improved cost optimization algorithm optimal plans are built bottom-up, i.e., the candidate optimal plans for a query are constructed from optimal plans of its immediate subqueries. As in traditional optimizers, the optimizer 11 treats the conjuncts (e.g., salary >50k) that are built-in boolean conditions (sargable predicates) specially. They are not reordered but instead their effect is considered for selectivity factors as well as for determining access paths in the local optimizer. Finally, note that the improved algorithm discards the join orders which do not satisfy the safety constraints (not shown in Appendix A).

When accessing the plan table 48, it is beneficial to ensure that searching for the optimal plan of a query is efficient. One efficient approach is to maintain the plan table as a hash-table where each query is represented as a sorted list of integers. Every integer corresponds to the index of the entry a global literal table where literals of the queries are stored. Therefore, comparison of two queries amounts to checking whether two strings are equal and thus can be done very efficiently. The following example illustrates the representation of the literals as well as how the commonality among queries are captured in this representation.

EXAMPLE 8

This example makes use of the queries Q and Q' of Example 7. Assume that the indexes for the global literal table corresponding to the literals in the query Q are 1,2,3, and 4 from left to right. Therefore, Q will be represented by the string (1234). However, once the rewrite rule is applied, a new literal Map_Restaurant(eid,loc) is created which is entered with an index 5 in the global literal table. The representation for Q' will be (145). The optimization of the query Q creates the optimal plan for (14) which is then stored in the plan table. During the optimization of the query Q', first the plan table is consulted to see whether a plan for (145) already exists. Since it does not exist, the optimal plans for each subplan are recursively constructed. In particular, before constructing the optimal plan for (14), the plan table is consulted and the optimal plan of (14) is reused for optimization.

The improved cost optimization algorithm has the desirable features that for no subquery, a subplan is rederived. Moreover, only plans for shared subqueries are retained in the plan table.

It is well-known that dynamic programming based algorithms can be presented either as top-down or bottom-up (see Cormen et al., supra). Therefore, a variant of the cost optimization algorithm can be created, namely a bottom-up approach. Indeed, there can be two possible variants in a bottom-up approach. One possibility is to optimize all the equivalent queries together. Thus, optimal plans for all subqueries of size n are constructed before any optimal plan for any subquery of size (n+1) is constructed. This approach has the advantage that it requires less space than the top-down approach since to construct any plan of size (n+1), only plans of size n are needed and so space may be reused. Unfortunately, since the subqueries for all equivalent queries are constructed together, the time for the completion of the optimal plan for any of the equivalent queries is longer than the top-down approach. Another variant of the bottom-up approach is where optimization is done one query at a time but the optimal plans of shared subqueries are saved. While this rectifies the shortcoming of the previous approach, it suffers from the problem of not being able to share the largest common subquery as the following example illustrates.

EXAMPLE 9

Assume that there are two queries in the closure with the representations (1234) and (1235). The queries share the subquery (123). Assume that the optimal plan for (1234), and hence for (123), have already been constructed. Consider the task of building an optimal plan for (1235). If the optimizer uses the bottom-up approach, it fails to recognize the existence of the cached plan (123) until all smaller plans are constructed and therefore, unnecessary accesses to plan table will be made.

Thus, there are pros and cons of using a bottom-up or a top-down version of the optimization algorithm. It may be preferable to use the top-down variant augmented with a branch and bound strategy. Thus, if a partial plan is found to have exceeded the cost of the optimal plan that has been found so far, then that partial plan need not be completed since it is guaranteed to be suboptimal.

Heuristic techniques may also be incorporated into the optimization process. For example, heuristics may be used to determine the order in which queries are optimized. Also, it may be beneficial to discard search for an optimal plan (instead of enumerating the entire space) after a significant improvement over the optimal plan for the given query is obtained.

Inexpensive and affiliated predicates may also play an important role in optimization. In a traditional relational optimizer, selection conditions are not reordered like other database relations. Rather, the selection conditions are evaluated as early as possible. Indeed, the cost of reordering joins is exponential in the number of literals being reordered. Therefore, unnecessary reordering introduces overhead for the optimizer. Consider a foreign table such as Inside(w, loc) which checks whether a point loc is inside window w. The invocation of such a table is inexpensive. Therefore, optimization costs can be decreased by designating certain foreign tables as inexpensive tables. The literals in a query that correspond to inexpensive tables are not reordered, while the rest of the literals are reordered. The literals corresponding to inexpensive tables are evaluated as early as possible in safe ordering of reorderable literals. The presence of inexpensive conjuncts introduce the step of generating reorderable units by the reorderable unit generator 44 of FIG. 4. The sargable predicates in a relational optimizer have the property that they may be pushed down to the storage system layer. See Selinger et al., supra. Likewise, the facility to indicate which inexpensive tables are affiliated to a reorderable table may also be provided. This information may be exploited during optimization.

The query processing techniques for foreign functions used by the optimizer 46 are now described. In particular, the focus is on query processing techniques for the join operation. In the subsequent description of the cost model, it is assumed that the foreign table occurs as the right child of a join node in a left-deep tree. Therefore, in a left-deep join tree, it is assumed that the foreign table joins with some other table (intermediate or base), which is referred to as left table.

The key point is that any access to a foreign table must respect the safety constraints. Therefore, before a tuple can be obtained from a foreign table, it must be passed the bindings that are required due to safety constraints. In most systems, for each binding, an invocation is made for the foreign function. Such a technique is inefficient for invoking foreign functions which have high cost of invocation and return many tuples as output. Therefore, according to the invention, query processing for foreign functions consists of viewing the "join" with a foreign table to have two phases: invocation and residual join. The invocation phase consists of passing the values for the bound arguments of the foreign table from the left table. There are several ways in which this invocation may occur:

Simple Invocation: In this scheme, for each tuple in the left table an invocation is made for the corresponding bound arguments, as specified in the safety constraint.

Group Invocation: In this scheme, for each distinct values of the bound arguments from the left relation, a single invocation is made for the bound arguments.

The group invocation technique adds the overhead of identifying the set of distinct values for the bound arguments. However, it has the advantage of fewer invocations, which is important for foreign tables for which each invocation is expensive (for example, computing the mean distance of a point from all other points). Moreover, if the left table is already sorted on the bound arguments prior to join, then group invocation is superior.

Since an invocation generates a set of tuples, the step of residual join is similar to a traditional join and any join method may be used. Also, the selection conditions that apply to one or more free (f) arguments of the foreign table are evaluated during this phase. The simplest choice for the residual join is nested loop where the tuples generated for each invocation are treated as the inner table for the join. The only difference is that the inner table changes (potentially) for each invocation. This residual join method can be combined with the two techniques for invocation.

The combination of simple invocation and the choice of nested loop join technique results in a join algorithm which is similar to the traditional nested loop join and is referred to as foreign nested loop join (FNL). The combination of group invocation and the choice of nested loop join results in an algorithm similar to the sort merge join and is referred as foreign sort-merge join (FSM). An example of programming code for the FSM algorithm appears in Appendix B (i.e., Foreign Sort Merge Join Algorithm). The FSM algorithm is preferred when the invocation of foreign tables is expensive. Finally, to reduce the number of invocations, catching results of invocation was suggested in the context of Postgres and such an alternative can be used with our approach to query processing. See, e.g., Stonebraker et al., supra.

The cost model must be able to compute the cost of any given plan. For traditional relational optimizers, a descriptor for a table includes statistical information about the table such as the number of unique values in each argument position (i.e., in each column) and the expected number of tuples in the table. The cost model uses the descriptors to compute the cost of an operation (e.g, a join). The cost model also produces a new descriptor which contains the statistical information of the intermediate table which is obtained after the operation.

Although the approach of the invention to the cost model is to preserve the relational descriptor for database and intermediate tables, the invention requires two extensions. First, a descriptor for foreign tables must be provided. Second, explanations of on how such a descriptor can be used to obtain the cost of an operation and how one can derive the relational descriptor for the intermediate table after a "join" with the foreign table. For each foreign table, the following information can be registered:

Safety Constraints: This information is not directly used by the cost model, but is used by the optimizer.

Cost: The cost of invoking the foreign table once.

Fanout: The number of "output tuples" expected for each invocation.

For each attribute:
Domain Size: The size of the representation of each domain element. The cardinality of the domain. A permissible assignment to cardinality is infinite.

Unique Value Factor: The expected number of unique values the attribute has for each invocation. If this parameter is not explicitly provided, the fanout is used to approximate this factor. If all the domains are finite, uniform distribution assumption is used to compute this factor as well.

One should observe that except for safety, all the other properties of the descriptor are relevant for the cost model. The cost model is an extension of the model proposed in Chimenti et al., *Towards an open architecture for LDL*, Proceedings of the 15th International VLDB Conference, pp. 195–203, Amsterdam, August 1989. One should also observe that the parameters in the descriptor need not necessarily be constants, but can depend as well on any constants that appear in the query at compile-time. An example of a descriptor for a foreign is provided below.

EXAMPLE 10

The descriptor for the foreign table Intersect$^{bbf}$(window1, window2, window3) could be characterized by a cost of 0.012ms, a fanout of 1, unique value factor of 1. The size of each domain element is that corresponding to a real and has domain size-infinite}. Observe that fanout and unique value factor is 1.

To compute the descriptor extensions are needed. For simplicity, only the situation when the foreign table occurs as a right child of left deep join trees is described. Since it is assumed that the foreign table appears as some right leaf node, one can also assume the existence of a descriptor for the intermediate relation, which is referred to as the left relation. In the optimizer 46, one can register a customized function to compute the resulting descriptor. Such a function can take as its argument the descriptor for the left relation. Below is described a default way to compute the descriptor for the intermediate table.

Before, describing the formulas to derive the descriptor, it is useful to explain the left uniqueness factor. The left uniqueness factor estimates the expected number of distinct invocations of the foreign table for the given descriptor for the left relation. There exist several ways to approximate the left uniqueness factor. One way is to use a simple formula for the left uniqueness factor as described below.

For the foreign table, one or more argument positions will be required to be bound. Therefore, there exists a corresponding set of attributes A in the left relation which provide the values for the bound arguments of the foreign table. Let P be the product of the expected number of unique values for the set of attributes A in the left relation. The descriptor of the left relation is used to compute P. Clearly, the number of distinct invocations can not exceed P. However, the number of distinct invocations also may not exceed N, the number of tuples in the left relation. Therefore, min(P,N) can be used as the left uniqueness factor. Observe that our formula provides an upper bound of the left uniqueness factor. An example shows an application of the formula.

EXAMPLE 11

Consider the following query which provides the location of the terminals for the bus routes.

Query(route,loc):-Terminal(route, eid), Map(eid, loc)

Assume that the descriptor for Terminal has 100 tuples but the number of expected unique values in the second argument is expected to be 10. In such a case, the left uniqueness factor will be estimated as 10.

In the following description, it is assumed that there are no selection conditions other than equality between the left table and the bound arguments of the foreign table. The effect of output selection conditions as well as effect of projection on foreign tables on the descriptor are computed by treating the result of the join of left relation with the foreign table as an intermediate table (like any interior node of the join tree). Therefore, the cost formulas provided below are for the invocation phase only.

Number of Tuples: The estimated number of tuples following the join is N'=F*N, where F is the fanout of the foreign table and N is the number of tuples in the left relation.

Number of Unique Values: The estimated number of unique values corresponding to the $i^{th}$ argument of the foreign table is given by: $UVF_i*UI$ where $UVF_i$ is the unique value factor for the $i^{th}$ attribute. The parameter UI is the left uniqueness factor, discussed earlier.

Cost: Cost of foreign nested loop and foreign sort-merge join are provided. Assume that N is the number of tuples in the left relation, C is the cost of invoking the foreign table and UI is the uniqueness factor. The following costs are for the invocation phase only.

Foreign Nested Loop: C*N

Foreign Sort-Merge: $Cost_{sort}(N)+UI*C$

The many features and advantages of the present invention are apparent from the written description and thus it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

APPENDIX A

```
Function gen_closure(R,Q)            Function rewrite(r,Q)
  begin                                begin
    S = Q;                               Q_r = 0
    δ = Q;                               for every sound application
    repeat                                 A of r to Q do
      new = 0                                Q_r = Q_r ∪ {A_Q}
      for each q in δ and r in R           where A_Q is the derived
      do                                     query
        new = new ∪ rewrite(r,q);          due to application A
      endfor                               endfor
      if new ⊆ S then return(S);         return(Q_r)
      δ = new - S;                       end
      S = S∪δ;
    forever
  end
              Algorithm to Compute Closure
              Procedure OptPlan(Q)
                begin
                  if exisisoptimal(Q) then return;
                  Let Q = (q_1,...,q_n);
                  Let S_i = Q - {q_i};
                  for each i do
                    OptPlan(S_i);
                    Qi = Plan for Q from S_i and q_i
                  endfor;
                  Choose best among Q_i
                  and add to plan table.
                end
              Optimization Algorithm
```

APPENDIX B

```
Function FSM(Left,FTable)
(Left is left relation,FTABLE is a Foreign Table)
  begin
    Join = 0
    Temp_Left = GROUPBY(Left,Bound)
    where sorting and Graping is on bound arguments of FTable
    for every group Li of Temp_Left do
      FT_i = Invoke(FTable,Bval_i)
      where Bval_i are the values in partition L_i
      for bound arguments of Bound
      Join = Bag_Union(Join,Merge(L_i,FT_i))
    endfor
    return(Join)
  end
        Foreign Sort Merge Join Algorithm
```

We claim:

1. A method for optimization of a query invoking relational database tables and foreign functions, said method comprising:

(a) providing rewrite rules for the foreign functions;

(b) receiving an input query to be executed;

(c) generating alternative queries from the input query and the rewrite rules by determining if a left-side of at least one of the rewrite rules is equivalent to at least a portion of the query using substitution mapping;

(d) generating an optimal plan for each said alternative query; and (e) selecting for execution a lowest cost plan among said optimal plans.

2. A method as recited in claim 1, wherein said generating step (d) comprises:

(d1) generating optimal plans for the input query and for at least one of the alternative queries; and (d2) selecting for execution a lowest cost plan among said optimal plans.

3. A method as recited in claim 2, wherein said generating step (d1) exploits commonality among queries across multiple queries.

4. A relational database management system, comprising:

A relational database having a plurality of tuples;

means for accessing at least one foreign function having declarative rewrite rules associated therewith; and an optimizer for optimizing a query accessing said relational database and said at least one foreign function using cost information; wherein said rewrite rules associated with each of said at least one foreign functions are expressed in a high-level declarative language which is an extension of SQL having the form REWRITE Query 1 AS Query 2; and wherein said optimizer uses said rewrite rules to generate equivalent queries by making substitutions indicated by said rewrite rules.

5. A relational database management system as recited in claim 4, wherein an optimal plan is selected from said equivalent queries.

6. A relational database management system as recited in claim 4, wherein the cost information comprises cost information on the foreign functions.

7. A relational database management system, comprising:

a relational database having a plurality of tuples;

at least one foreign function having declarative rewrite rules associated therewith; and an optimizer for optimizing a query accessing said relational database and said at least one foreign function using cost information; wherein said rewrite rules are used to generate equivalent queries by substituting a right-hand side of a rewrite rule for at least a portion of the query which corresponds to a left-hand side of the rewrite rule.

8. A relational database management system as recited in claim 7, wherein said optimizer uses substitution mapping to determine if one of the rewrite rules is applicable to at least a portion of the query.

9. A relational database management system as recited in claim 7, wherein the rewrite rules are stored in a rule table indexed on the conjuncts that appear on the left-side of the rewrite rules.

10. A relational database management system as recited in claim 7, wherein said optimizer exploits commonality among queries across multiple queries.

11. A relational database management system as recited in claim 10, wherein said relational database system further comprises a plan table which stories previously determined optimal plans for subqueries to exploit the commonality.

12. A relational database management system as recited in claim 10, wherein said plan table is a hash-table where each subquery is represented as a sorted list of integers.

13. A query optimization system for optimizing a query invoking relational database tables and foreign functions, said system comprising:

means for providing, in a high-level declarative language which is an extension of SQL, rewrite rules for the foreign functions of the form REWRITE Query 1 AS Query 2;

means for providing cost information for the foreign functions;

means for receiving a query to be executed;

means for generating alternative queries from the query and the rewrite rules;

means for generating an optimal plan using the cost information;

means for executing said optimal plan.

* * * * *